US012749300B2

(12) United States Patent
Jeong et al.

(10) Patent No.: US 12,749,300 B2
(45) Date of Patent: Sep. 29, 2026

(54) INTERPOLATION MODEL LEARNING METHOD AND DEVICE FOR LEARNING INTERPOLATION FRAME GENERATING MODULE

(71) Applicant: Samsung Electronics Co., Ltd., Suwon-si (KR)

(72) Inventors: Yowon Jeong, Suwon-si (KR); Junsik Jung, Daejeon-si (KR); Sungeui Yoon, Daejeon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 286 days.

(21) Appl. No.: 18/543,506

(22) Filed: Dec. 18, 2023

(65) Prior Publication Data

US 2024/0203113 A1 Jun. 20, 2024

(30) Foreign Application Priority Data

Dec. 19, 2022 (KR) ........................ 10-2022-0178683

(51) Int. Cl.

*G06V 20/40* (2022.01)
*G06V 10/77* (2022.01)
*G06V 10/82* (2022.01)

(52) U.S. Cl.

CPC .......... *G06V 10/82* (2022.01); *G06V 10/7715* (2022.01); *G06V 20/46* (2022.01)

(58) Field of Classification Search

CPC .... G06V 10/82; G06V 10/7715; G06V 10/40; G06V 20/46; G06T 3/4007;

(Continued)

(56) References Cited

U.S. PATENT DOCUMENTS 11,363,271 B2 6/2022 Li et al.
11,430,138 B2 8/2022 Chi et al.

(Continued)

FOREIGN PATENT DOCUMENTS

CN 111405283 A 7/2020
CN 112465021 A 3/2021

(Continued)

OTHER PUBLICATIONS

Argaw et al., Long-term Video Frame Interpolation via Feature Propagation, 2022, IEEE/CVF Conference on Computer Vision and Pattern Recognition, pp. 1-11. (Year: 2022).*

*Primary Examiner* — Kathleen M Broughton

(74) *Attorney, Agent, or Firm* — Harness, Dickey & Pierce, P.L.C.

(57) ABSTRACT

An interpolation model learning method, a non-transitory computer-readable storage medium storing instructions allowing the method to be performed, and a device for learning an interpolation frame generating module are provided. The interpolation model learning method may include extracting, by using a neural network model, a temporal-spatial feature of each of a frame group including an interpolation frame generated by an interpolation model based on a neural network and a frame group including a ground truth (GT) frame corresponding to an interpolation frame and changing a weight and/or a bias of a neural network of an interpolation model to decrease a difference between temporal-spatial features.

19 Claims, 14 Drawing Sheets

(58) Field of Classification Search
CPC ......... G06T 3/4046; G06T 2207/20081; G06T 2207/20084; G06N 3/0464
See application file for complete search history.

(56) References Cited

U.S. PATENT DOCUMENTS

| | | | | |
|---|---|---|---|---|
| 2018/0205909 | A1* | 7/2018 | Staranowicz | H04N 11/20 |
| 2019/0124346 | A1* | 4/2019 | Ren | G06N 3/09 |
| 2021/0383169 | A1* | 12/2021 | Wang | G06T 3/4046 |
| 2022/0321830 | A1* | 10/2022 | Niklaus | G06N 3/09 |
| 2022/0400226 | A1* | 12/2022 | Liang | G06V 10/462 |
| 2023/0344962 | A1* | 10/2023 | Tran | H04N 7/0127 |

FOREIGN PATENT DOCUMENTS

| | | | |
|---|---|---|---|
| CN | 114339409 | A | 4/2022 |
| CN | 114692765 | A | 7/2022 |
| CN | 114723991 | A | 7/2022 |
| KR | 102467673 | B1 | 11/2022 |

* cited by examiner

INTERPOLATION MODEL LEARNING METHOD AND DEVICE FOR LEARNING INTERPOLATION FRAME GENERATING MODULE

CROSS-REFERENCE TO RELATED APPLICATION

This application is based on and claims priority under 35 U.S.C. § 119 to Korean Patent Application No. 10-2022-0178683, filed on Dec. 19, 2022, in the Korean Intellectual Property Office, the contents of which are incorporated by reference herein in their entirety.

BACKGROUND

The inventive concepts relate to an interpolation model learning method and a device for learning an interpolation frame generating module.

An artificial intelligence (AI) system is a computer system, which implements human-like learning, and is a system where a machine determines autonomously, performs learning, and advances. A recognition rate of the AI system is enhanced as the use thereof increases, and recently, various kinds of electronic devices or data processing systems are being applied to the AI system.

Various kinds of neural network models based on machine learning or deep learning are being applied to the AI system. As neural network technology advances and hardware for reproducing and storing a high-resolution/high-quality image or a slow motion image is developed and supplied, the needs for methods and apparatuses for effectively generating an interpolation frame of an image by using a neural network are increasing.

SUMMARY

The inventive concepts provides an interpolation model learning method and a device for learning an interpolation frame generating module, which may extract and compare temporal-spatial features of continuous frames to enhance the performance of an interpolation model, and a computer-readable non-transitory storage medium storing the interpolation model learning method.

According to an aspect of the inventive concepts, there is provided an interpolation model learning method including extracting, from a video including a plurality of continuous frames, a first ground truth (GT) frame and a plurality of frames; generating a first interpolation frame based on the plurality of frames by using an interpolation model; extracting a first temporal-spatial feature of a first frame group including at least three frames including the first GT frame, based on a first feature extraction model based on a neural network; extracting a first temporal-spatial feature of a first frame group including at least three frames including the first GT frame, based on a first feature extraction model, the first feature extraction model being based on a neural network; and training the interpolation model, based on the first temporal-spatial feature and the second temporal-spatial feature.

According to another aspect of the inventive concepts, there is provided a device configured to learn an interpolation frame generating model, the device including a memory storing a program configured to train the interpolation frame generating model; and a processor configured to execute the program stored in the memory, wherein the processor is configured to, by executing the program, extract a first frame, a second frame, and a first ground truth (GT) frame, temporally arranged between the first frame and the second frame, from a plurality of continuous frames and generate a first interpolation frame between the first frame and the second frame using the interpolation frame generating model, extract a first complex feature between a plurality of frames included in a first frame group, based on a first feature extraction model, the first frame group comprising the first GT frame and at least two frames, extract a second complex feature between a plurality of frames included in a second frame group, based on the first feature extraction model, the second frame group comprising the first interpolation frame and the at least two frames, and train the interpolation frame generating model, based on the first complex feature and the second complex feature.

According to another aspect of the inventive concepts, there is provided a non-transitory computer-readable storage medium storing instructions, which when executed by a processor, cause the processor to perform learning of an interpolation model using a plurality of continuous frames, the plurality of continuous frames comprise a first frame, a second frame, and a first ground truth (GT) frame temporally arranged between the first frame and the second frame, the instructions including generate a first interpolation frame between the first frame and the second frame using the interpolation model; extract a first temporal-spatial feature of a first frame group, including at least three frames including the first GT frame, using a neural network model for extracting a temporal-spatial feature between frames; extract a second temporal-spatial feature of a second frame group, including at least three frames including the first interpolation frame, using the neural network model; determine temporal-spatial loss information based on a difference between the first temporal-spatial feature and the second temporal-spatial feature; and train the interpolation model by using the temporal-spatial loss information.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
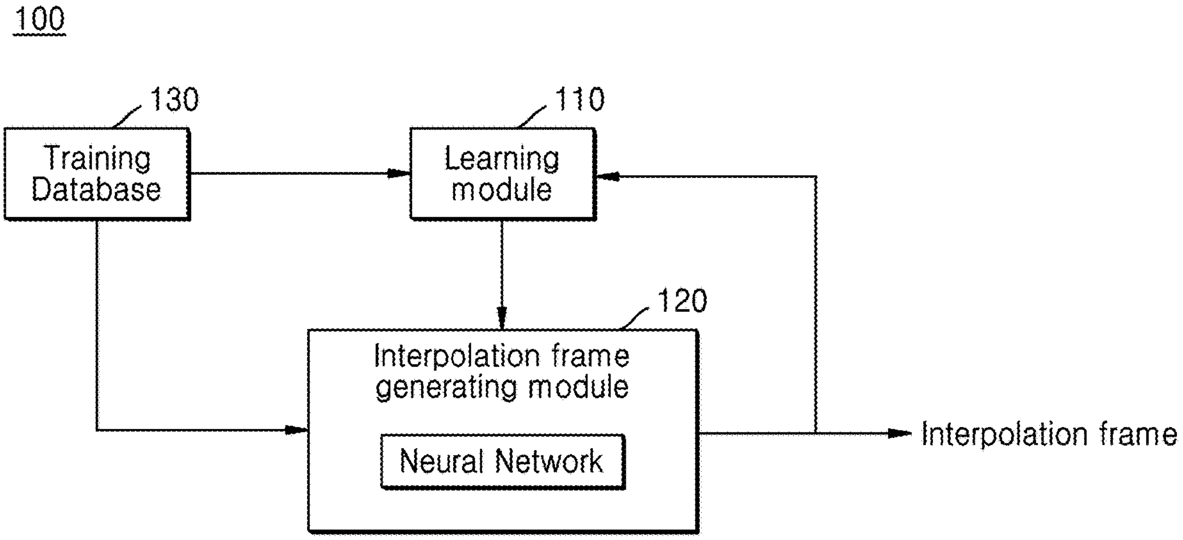
FIG. 1 is a block diagram illustrating an electronic system according to at least one embodiment.

Hereinafter, embodiments will be described in detail with reference to the accompanying drawings.

In the drawings, the functional blocks denoting elements that process (and/or perform) at least one function or operation and may be included in and/or implemented as processing circuitry such hardware, software, or the combination of hardware and software. For example, the processing circuitry more specifically may include (and/or be included in), but is not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, application-specific integrated circuit (ASIC), semiconductor elements in an integrated circuit, circuits enrolled as an intellectual property (IP), etc.

FIG. 1 is a block diagram illustrating an electronic system 100 according to at least one embodiment.

The electronic system 100 of FIG. 1 is configured to generate (perform inference based on a neural network) an interpolation frame based on a plurality of frames input based on the neural network and to train the neural network, based on the generated interpolation frame and the plurality of frames. Furthermore, the electronic system 100 may generate (perform inference based on the trained neural network) the interpolation frame by using the trained neural network. The electronic system 100 may be referred to as a neural network learning system. The electronic system 100 may be included in a device for learning (or training) an interpolation frame generating module.

The neural network may include various kinds of neural network models such as GoogleNet, AlexNet, convolution neural network (CNN) such as visual geometry group (VGG) network, region with convolution neural network (R-CNN), region proposal network (RPN), recurrent neural network (RNN), stacking-based deep neural network (S-DNN), state-space dynamic neural network (S-SDNN), deconvolution network, deep belief network (DBN), restricted Boltzman machine (RBM), fully convolutional network, long short-term memory (LSTM) network, a generative adversarial network (GAN), and/or classification network; and/or include linear and/or logistic regression, statistical clustering, Bayesian classification, decision trees, and/or the like, but are not limited thereto. Also, the neural network may include sub neural networks, and the sub neural networks may be implemented as heterogeneous neural networks.

The electronic system 100 of FIG. 1 may be an application processor (AP) applied to a mobile device. Alternatively, the electronic system 100 of FIG. 1 may correspond to a computing system, or may correspond to drones, an advanced driver assistance system (ADAS), robot devices, smart televisions (TVs), smartphones, medical devices, mobile devices, image display devices, measurement devices, Internet of things (IoT) devices, etc.

Referring to FIG. 1, the electronic system 100 may include a learning module 110 and an interpolation frame generating module 120, and the electronic system 100 may include a training database 130. In this case, continuous frames (or a video) for training the neural network may be stored in the training database 130.

Video frame interpolation may be for generating an accurate intermediate frame (or interpolation frame) between two input frames. The performance of a video frame interpolation algorithm may be based on high-level inference quality corresponding to occlusion and an operation on two frames.

To accomplish high-level inference quality, the learning module 110 may train the neural network (for example, a deep learning model). In at least one embodiment, the learning module 110 may train the neural network model used by the interpolation frame generating module 120. Hereinafter, the neural network model used to generate the interpolation frame by using the interpolation frame generating module 120 may be referred to as an interpolation model (or an interpolation frame generating model).

The learning module 110 may include feature extraction models. For example, in at least one embodiment, the feature extraction models may include at least two of a three-dimensional (3D) feature extraction module (510 of FIG. 6), a 3D loss calculation module (520 of FIG. 6), a two-dimensional (2D) feature extraction module (610 of FIG. 8), and/or a 2D loss calculation module (620 of FIG. 8).

The learning module 110 may receive a frame from the training database 130 and the interpolation frame generating module 120 and may train the interpolation model by using the modules (510, 520, 610, and 620) described above, based on a visual-spatial feature of a frame group including a plurality of frames or a spatial feature of the received frame. For example, various parameters (for example, bias, weight, etc.) of the neural network (see FIG. 2) may be determined through learning. In at least one embodiment, the learning module 110 may train the interpolation model so that the interpolation frame generating module 120 generates the interpolation frame in which a temporal-spatial characteristic is reflected.

The interpolation frame generating module 120 may generate the interpolation frame based on the interpolation model, and thus, an operation of training the interpolation model may be referred to as an operation of training the interpolation frame generating module 120.

The interpolation frame generating module 120 may receive a plurality of frames from the training database 130 to generate an interpolation frame between the plurality of frames, based on the interpolation model trained by the learning module 110.

Here, an interpolation frame may be a frame which is generated based on at least two continuous frames and may be temporally arranged between two frames. Because the interpolation frame is generated, the number of frames of a real-time rendering image or a conventional video (continuous frames) may increase, and a reduction in image quality such as shaking of a video may be prevented, thereby naturally displaying an image.

The interpolation frame is not a real (or actually) photographed frame, and because the interpolation frame is a frame generated based on the real photographed frame, the interpolation frame may have a difference with a ground truth (GT) frame. In this case, as a spatial and/or temporal-spatial feature of the GT frame is well reflected in the interpolation frame (as a spatial and/or temporal-spatial feature difference is reduced), the quality of an image by the interpolation frame may increase.

Here, the GT frame may be a frame temporally corresponding to an interpolation frame and may be a right answer frame. Therefore, an interpolation model may be trained based on a comparison result obtained by comparing the interpolation frame with the GT frame, and thus, the performance of the interpolation frame generating module 120 may be enhanced.

Real photographed frames may be stored in the training database 130. The real photographed frame may include at least two frames for generating the GT frame and the interpolation frame corresponding to the GT frame.

In another embodiments, a plurality of interpolation frames and a plurality of GT frames may be used. In this case, the plurality of interpolation frames and the plurality of GT frames may each be frames temporally corresponding to each other.

The interpolation frame generating module 120 may extract characteristic information about an input frame, based on a trained neural network (for example, a neural network trained or retrained by the learning module 110), and may obtain an interpolation frame based on the extracted characteristic information. For example, in order to perform a task needed for the electronic system 100, the interpolation frame generating module 120 may perform inference on an input image based on the neural network. Operations of the neural network performed in an inference process may be performed a separate accelerator (for example, a graphics processing unit (GPU), a neural processing unit (NPU), a digital signal processor (DSP), or a field programmable gate array (FPGA)).

The learning module 110 and the interpolation frame generating module 120 may be implemented as software, hardware, or a combination of software and hardware. In at least one embodiment, the learning module 110 and the interpolation frame generating module 120 may be implemented as an operating system (OS) or a software type at a lower end thereof, and moreover, may be implemented as programs capable of being loaded into a memory included in the electronic system 100 and may be executed by at least one processor of the electronic system 100.

Figure 2:
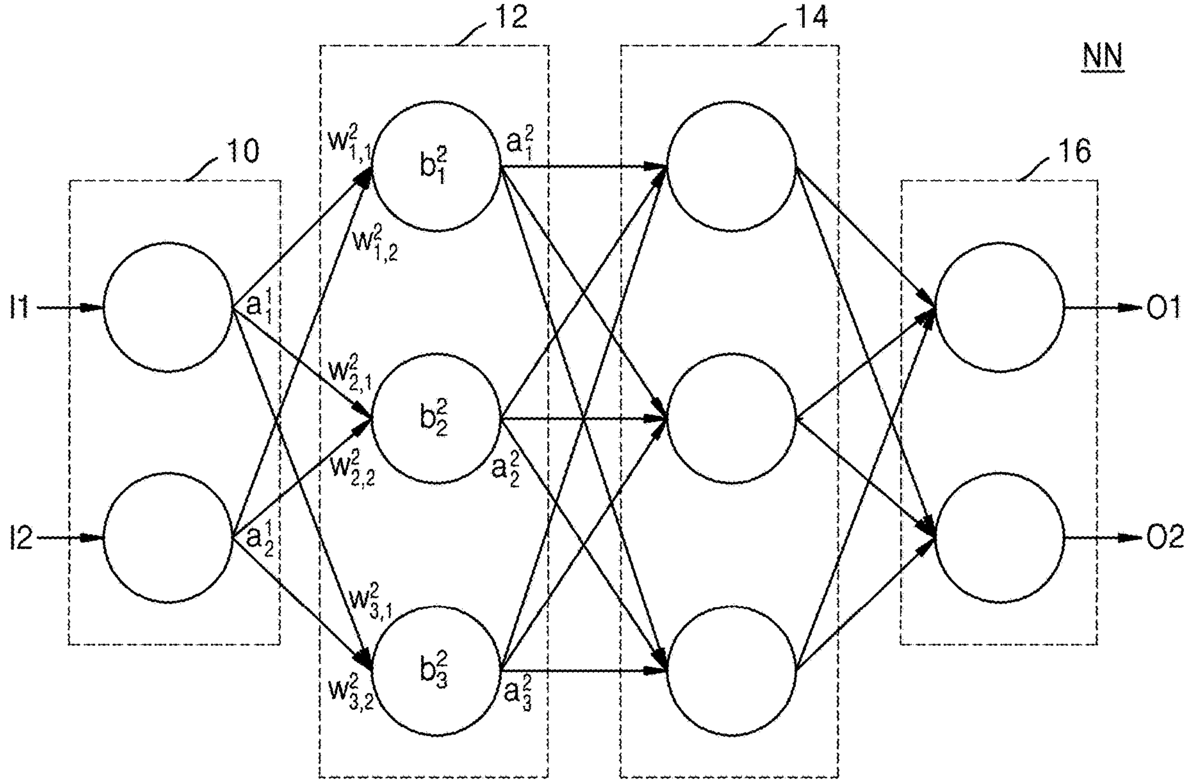
FIG. 2 illustrates an example of a neural network applied to an interpolation model according to at least one embodiment.

FIG. 2 illustrates an example of a neural network NN applied to an interpolation model according to at least one embodiment.

Referring to FIG. 2, the neural network NN may have a structure which includes an input layer, hidden layers, and an output layer. The neural network NN may perform an operation based on received input data (for example, I1 and I2) and may generate output data (for example, O1 and O2) based on a performance result.

The neural network NN may be n-layers neural networks or a deep neural network (DNN) including two or more hidden layers. For example, as illustrated in FIG. 2, the neural network NN may be a DNN which includes an input layer 10, first and second hidden layers 12 and 14, and an output layer 16.

A plurality of layers may be implemented as a conventional layer, a fully-connected layer, and a softmax layer. For example, the convolution layer may include convolution, pooling, and an active function operation. Alternatively, each of the convolution, the pooling, and the active function operation may configure a layer.

An output of each of the plurality of layers 10, 12, 14, and 16 may be referred to as a feature (or a feature map). The plurality of layers 10, 12, 14, and 16 may receive a feature, generated by a previous layer, as an input feature and may perform an operation on the input feature to generate an output feature or an output signal. The feature may denote data expressing various features of input data recognizable by the neural network NN.

The neural network NN may include a number of layers for extracting valid information having a DNN structure and may thus process complicated data sets. Furthermore, the neural network NN is illustrated as including four layers 10, 12, 14, and 16, but this is only at least one embodiment and the neural network NN may include fewer or more layers. Also, the neural network NN may include various layers having different structures unlike the illustration of FIG. 2.

Each of the plurality of layers 10, 12, 14, and 16 included in the neural network NN may include a plurality of neurons. A neuron may correspond to a processing element (PE), a unit, or artificial nodes known as the terms similar thereto. For example, as illustrated in FIG. 2, the input layer 10 may include two neurons (nodes), and each of first and second hidden layers 12 and 14 may include three neurons (nodes). However, this may be just at least one embodiment, and each of layers included in the neural network NN may include a various number of neurons (nodes).

Neurons included in each of the plurality of layers 10, 12, 14, and 16 included in the neural network NN may be connected with one another and may exchange data. One neuron may receive data from other neurons, perform an operation on the data, and output an operation result as other neurons.

An input and an output of each of neurons (nodes) may be referred to as an input activation and an output activation, respectively. For example, an activation may be a parameter which is an output of one neuron and corresponds to an input of each of neurons included in a next layer. Each of neurons may determine an activation thereof, based on weights (for example, $$w^2_{1,1}, w^2_{1,2}, w^2_{2,1}, w^2_{2,2}, w^2_{3,1}, w^2_{3,2},$$

etc.), biases (for example, $$b^2_1, b^2_2, b^2_3,$$

etc.), and activations (for example, $$a^2_1, a^2_2, a^2_3,$$

etc.) received from neurons included in a previous layer. A weight and a bias may each be referred to as a parameter (or an operation parameter) used to calculate an output activation in each neuron. For example, a weight may represent a weight between output activations (for example, $$a^1_1 \text{ and } a^2_2$$

) of a previous layer, and a bias may represent a value added before being applied to each neuron. As described above with reference to FIG. 1, the neural network NN may determine parameters, such as a weight and a bias, through training (for example, machine learning) based on training data.

Parameters such as a weight and a bias of an interpolation model of the interpolation frame generating module 120 may be changed through learning for decreasing loss information, based on temporal-spatial loss information ($\mathcal{L}_{3D}$ in FIG. 6) and spatial loss information ($\mathcal{L}_{2D}$ in FIG. 8) described below.

Figure 3:
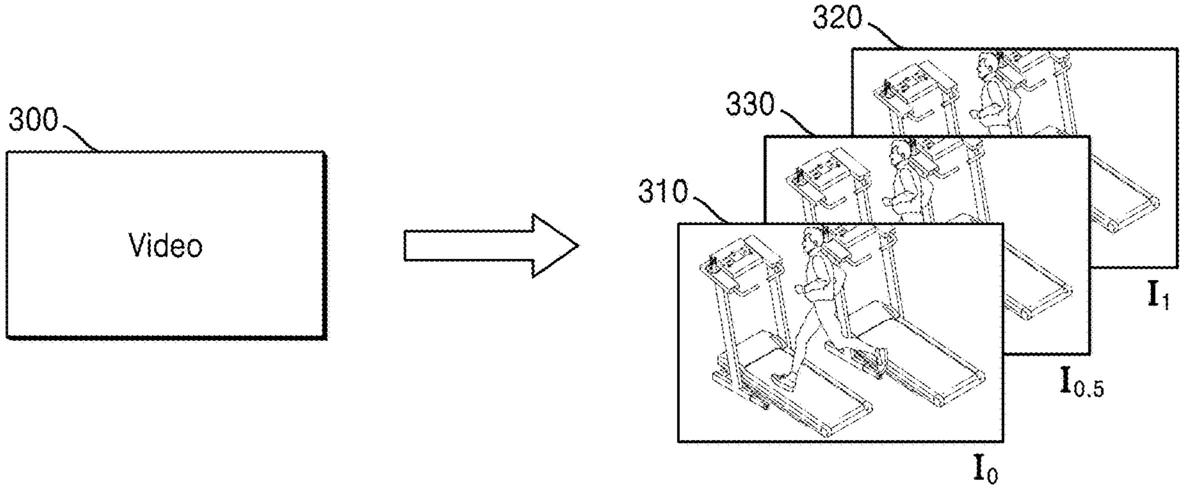
FIG. 3 illustrates a frame extracted from a video according to at least one embodiment.

FIG. 3 illustrates a frame extracted from a video according to at least one embodiment.

Referring to FIG. 3, the training database 130 of FIG. 1 may include a video 300 including continuous frames.

The video 300 may include a plurality of frames, including a first frame ($I_0$) 310, a second frame ($I_1$) 320, and a first GT frame ($I_{0.5}$) 330. The first GT frame 330 may be temporally arranged between the first frame 310 and the second frame 320. For example, when the first frame 310 is a frame at t=0 and the second frame 320 is a frame at t=1, the first GT frame 330 may be a frame at t=0.5. In this case, "t" may be for relatively expressing a temporal position of a frame, and t may (or may not) be a positive integer.

The first frame 310, the second frame 320, and the first GT frame 330 from the video 300 may be extracted for generating an interpolation frame and learning of an interpolation model based on the neural network NN of the interpolation frame generating module 120.

As described above, the first GT frame 330 may be a frame corresponding to a first interpolation frame (340 of FIG. 4) generated by the interpolation frame generating module 120 and may be understood as a right answer frame for learning of the interpolation frame generating module 120. For example, the interpolation frame generating module 120 may generate the first interpolation frame (340 of FIG. 4), based on the first frame 310 and the second frame 320. The first interpolation frame (340 of FIG. 4) may be compared with the first GT frame 330, and the interpolation frame generating module 120 may be trained based on a comparison result. For example, parameters of the interpolation frame generating module 120 may be adjusted to reduce a difference between the first interpolation frame (340 of FIG. 4) and the first GT frame 330. As such, the interpolation frame generating module 120 is configured to generate interpolation frames in a video (e.g., one different from the video included in the training database 130) such that the frame rate and/or fluidity of the video is improved. For example, in at least one embodiment the interpolation frame generating module (120 of FIG. 1) may be configured to up-convert the frame rate of a video. The learning of the interpolation frame generating module (120 of FIG. 1) may be referred to as unsupervised learning.

Figure 4:
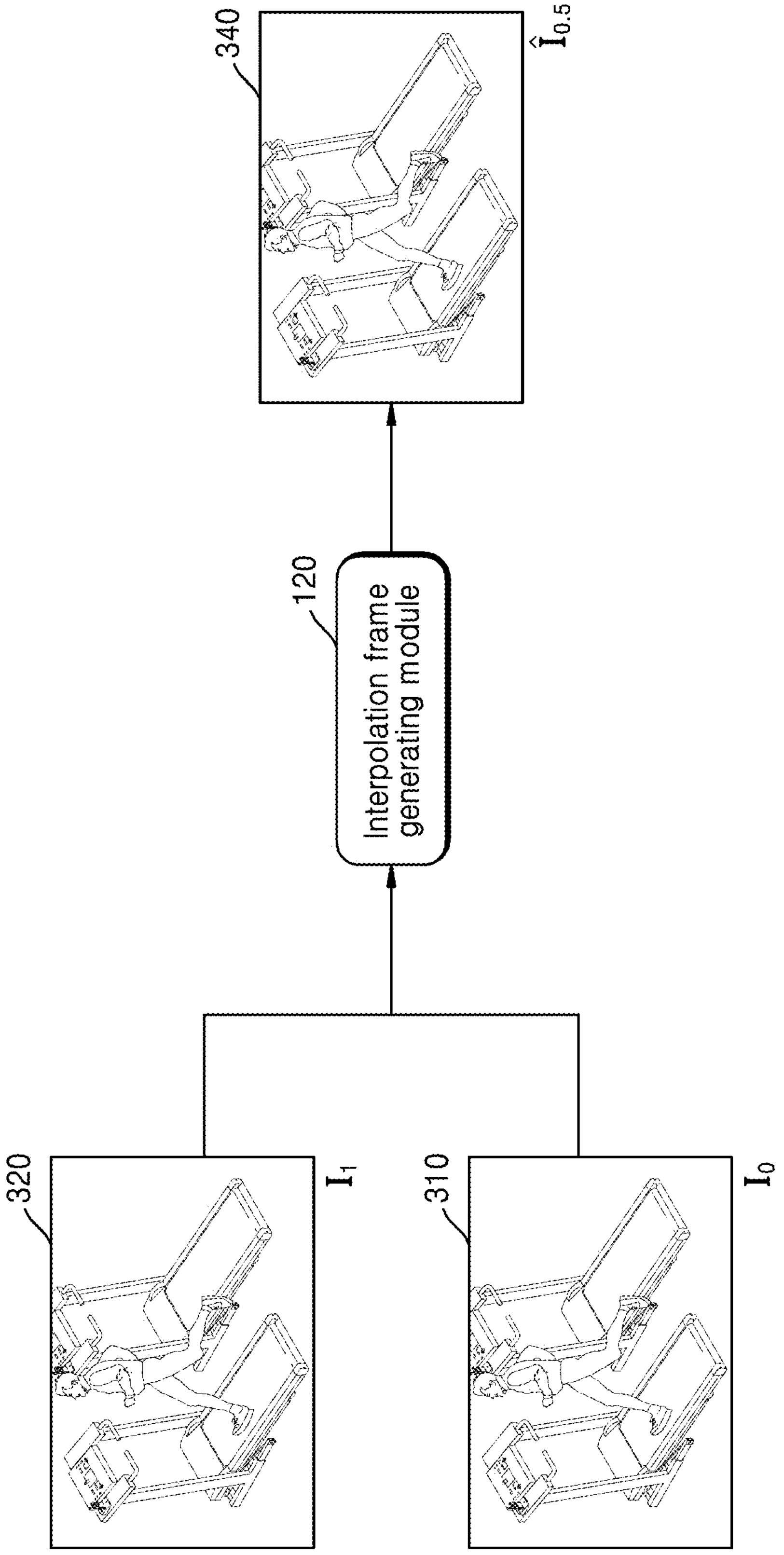
FIGS. 4 and 5 illustrate an interpolation frame generating operation by an interpolation frame generating module according to at least one embodiment.
Figure 5:
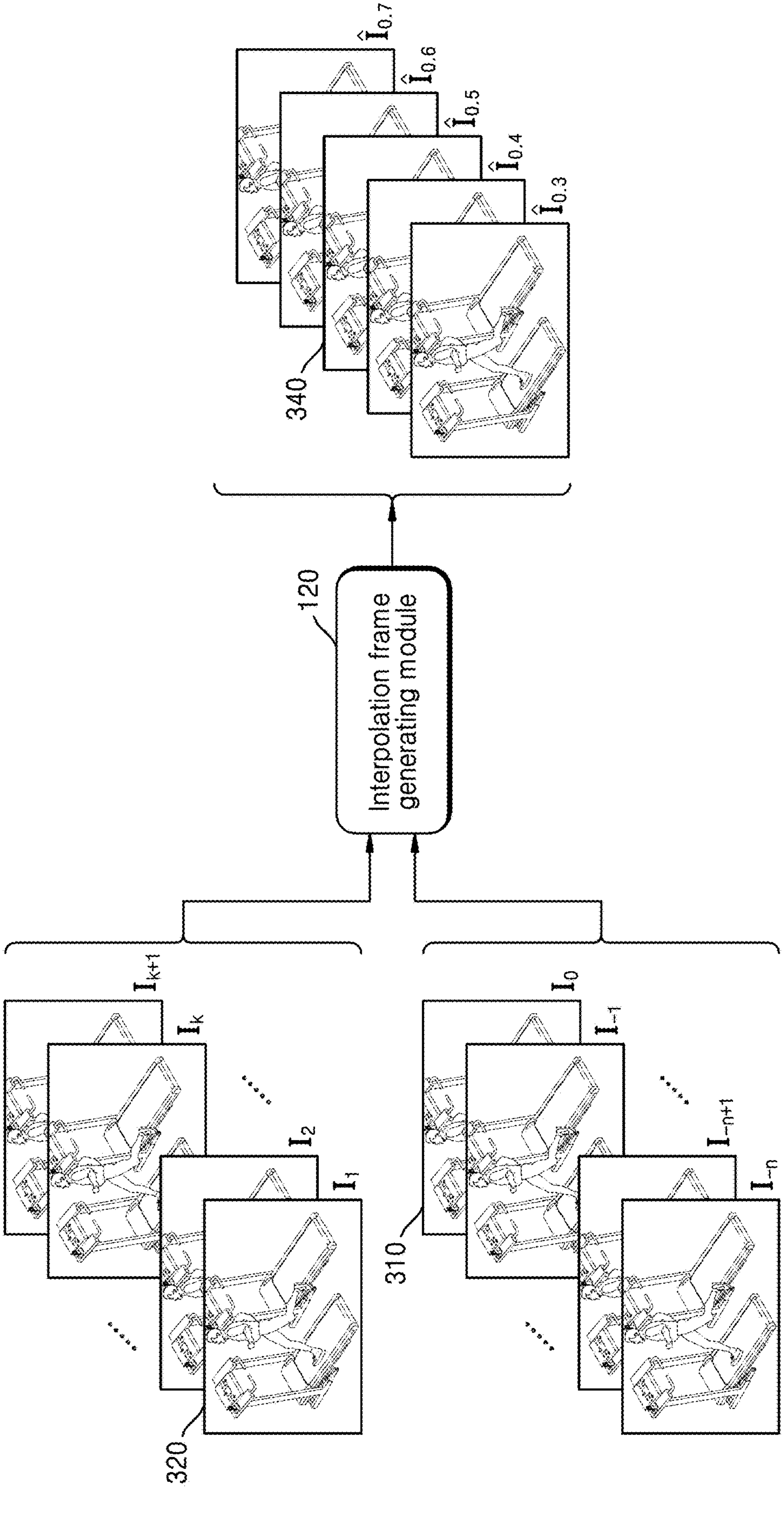

FIGS. 4 and 5 illustrate an interpolation frame generating operation by an interpolation frame generating module according to at least one embodiment.

FIG. 4 may be described with reference to FIG. 3, and repeated descriptions may be omitted.

An interpolation frame generating module 120 may generate a first interpolation frame ($\hat{I}_{0.5}$) 340 through an interpolation model, based on a first frame 310 and a second frame 320.

The first interpolation frame 340 may be a frame temporally corresponding to the first GT frame 330. For example, when the first frame 310 is a frame at t=0 and the second frame 320 is a frame at t=1, the first interpolation frame 340 and the first GT frame 330 may each be a frame at t=0.5. Therefore, the first interpolation frame 340 may be a frame corresponding to the first GT frame 330.

The number of frames input to the interpolation frame generating module 120 for generating an interpolation frame may be two or more. Referring to FIG. 5, the interpolation frame generating module 120 may generate a plurality of interpolation frames ($\hat{I}_{0.3}$ to $\hat{I}_{0.7}$), based on n number of frames preceding the first frame 310 and k number of frames temporally succeeding the second frame 320. In these cases, n may be an integer of 1 or more, and k may be an integer of 1 or more. That is, the interpolation frame generating module 120 may generate a plurality of interpolation frames based on a plurality of frames. For example, since the amount of data available for the interpolation frame generating module 120 increases with higher values of n and/or k, the interpolation frame generating module 120 of at least one embodiment may be trained to increase the number of interpolation frames for larger values of n and/or k. In FIG. 5, five interpolation frames are illustrated, but the number of interpolation frames generated by the interpolation frame generating module 120 is not limited thereto.

Although not shown in FIGS. 4 and 5, the interpolation frame generating module 120 may generate an interpolation frame, based on the first frame 310 and the first interpolation frame 340, and may generate a new interpolation frame, based on at least two interpolation frames.

The interpolation frame generating module 120 may generate the interpolation frame based on an interpolation model having a structure of the neural network NN described above with reference to FIG. 2. For example, the interpolation frame generating module 120 may use, as an interpolation model, at least one neural network model of full convolution based model (e.g., CAIN), optical flow based model (e.g., SuperSloMo), RIFE (Real time Intermediate Flow Estimation for video frame interpolation), and AdaCoF (Adaptive Collaboration of Flows for video frame interpolation). However, an interpolation model is not limited thereto and may include a neural network models for generating an interpolation frame.

An interpolation model of the interpolation frame generating module 120 may be trained by extracting and comparing features of the first interpolation frame 340 and the first GT frame 330 each generated by the interpolation frame generating module 120. For example, weights and/or biases of a neural network model (an interpolation model) of the interpolation frame generating module 120 may be adjusted based on a temporal-spatial feature comparison result of a first frame group 350, including a spatial feature comparison result (or the first GT frame) of the first interpolation frame 340 and the first GT frame 330, and a second frame group 360 including the first interpolation frame 340. Detailed description thereof is given with reference to FIGS. 6 and 8.

Figure 6:
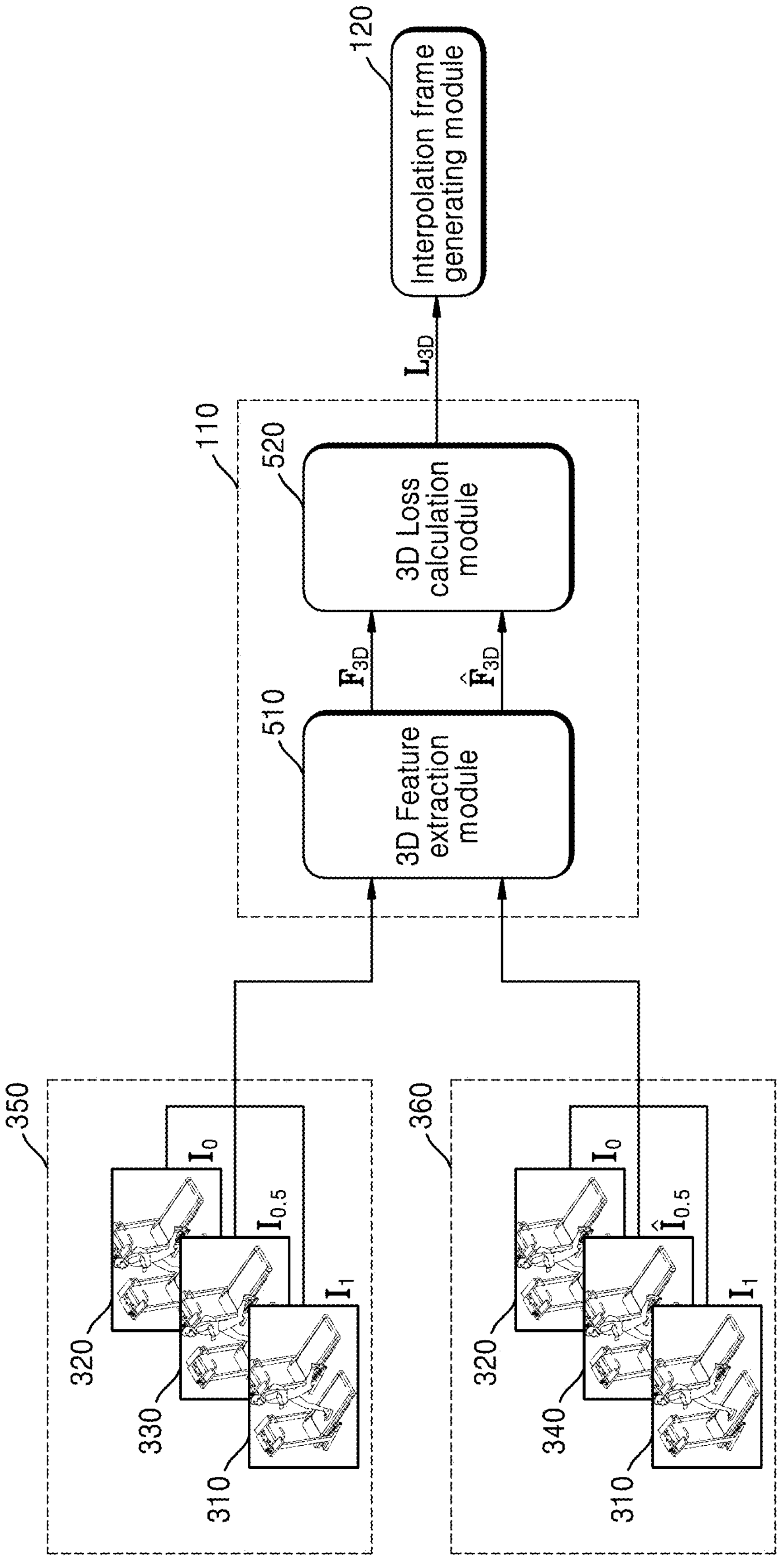
FIG. 6 is a diagram for describing an example which learns an interpolation frame generating module according to at least one embodiment.

FIG. 6 is a diagram for describing an example which learns an interpolation frame generating module according to at least one embodiment.

FIG. 6 may be described with reference to FIGS. 3 and 4, and repeated descriptions may be omitted.

The learning module 110 of FIG. 6 may include a 3D feature extraction module 510 and a 3D loss calculation module 520. The first frame group 350 and the second frame group 360 may be input to the learning module 110, and the learning module 110 may train the interpolation frame generating module 120 based on a temporal-spatial feature difference between the first frame group 350 and the second frame group 360.

Here, the first frame group 350 may include at least three frames including at least one GT frame, and the second frame group 360 may include at least three frames including at least one interpolation frame. For example, the first frame group 350 may include a first frame 310, a second frame 320, and a first GT frame 330, and the second frame group 360 may include the first frame 310, the second frame 320, and a first interpolation frame 340.

The 3D feature extraction module 510 may extract a temporal-spatial feature of a continuous frame by using a neural network model (a first feature extraction model) which extracts the temporal-spatial feature. Here, the temporal-spatial feature may be a feature map of a first feature extraction model. The first feature extraction model may be a trained 3D CNN. For example, the neural network model (the trained 3D CNN) extracting the temporal-spatial feature may include a plurality of convolution layers, and the feature map may correspond to input data of a convolution layer and a 3D convolution result of a filter. The 3D convolution may have a structure where adjacent frames (for example, three continuous frames) and a convolution operation are combined, and thus, a feature map (or a 3D feature map) including the temporal-spatial feature based on the continuous frame may be output. Therefore, an operation of extracting the 3D feature map may be referred to as an operation of extracting the temporal-spatial feature.

Referring to FIG. 6, the 3D feature extraction module 510 may extract a first temporal-spatial feature ($F_{3D}$) of the first frame group 350 and a second temporal-spatial feature ($\hat{F}_{3D}$) of the second frame group 360 by using the first feature extraction model (for example, the trained 3D CNN). Also, the 3D loss calculation module 520 may calculate temporal-spatial loss information ($\mathcal{L}_{3D}$) based on a difference between the first temporal-spatial feature ($F_{3D}$) and the second temporal-spatial feature ($\hat{F}_{3D}$) by using a first loss calculation function. Here, the first loss calculation function may denote a function of calculating a difference between temporal-spatial features.

For example, in a case where the 3D feature extraction module 510 extracts the first temporal-spatial feature ($F_{3D}$) and the second temporal-spatial feature ($\hat{F}_{3D}$) based on Resnet3D (R3D), which is a neural network model for extracting a temporal-spatial feature, the 3D loss calculation module 520 may calculate temporal-spatial loss information ($\mathcal{L}_{3D}$) by using the following first loss calculation function (Equation 1).

$$\mathcal{L}_{r3d} = \left\|\sigma(\hat{S}_t) - \sigma(S_{gt})\right\|_2^2 \qquad \text{[Equation 1]}$$

Equation 1 may be the first loss calculation function for calculating temporal-spatial loss information ($\mathcal{L}_{3D}$) based on a temporal-spatial feature difference (a difference $F_{3D}$ and $\hat{F}_{3D}$) in a case where the 3D feature extraction module 510 extracts a temporal-spatial feature of a frame group by using the R3D (the first feature extraction model). The first loss calculation function based on Equation 1 may represent a 3D perceptual loss function. The 3D perceptual loss function may denote an operation of comparing feature maps which are obtained by allowing an image to pass through a CNN model.

Here, $S_{gt}$ represents a frame group including at least three frames including a GT frame, and $\hat{S}_t$ represents a frame group including at least three frames including an interpolation frame. Therefore, $S_{gt}$ may be the first frame group 350, and $\hat{S}_t$ may be the second frame group 360.

Also, $\sigma(S_{gt})$ represents a 3D feature map including a temporal-spatial feature extracted from the second block of the R3D when a frame group (the first frame group 350) including a GT frame is input to the R3D. That is, $\hat{F}_{3D}$ may correspond to the first temporal-spatial feature ($F_{3D}$).

Also, $\sigma(\hat{S}_t)$ may be a 3D feature map including a temporal-spatial feature extracted from the second block of the R3D when a frame group (the second frame group 360) including an interpolation frame is input to the R3D. Also, $\hat{F}_{3D}$ may correspond to the second temporal-spatial feature ($\hat{F}_{3D}$).

Therefore, the 3D feature extraction module 510 may extract the first temporal-spatial feature ($\sigma(S_{gt})$ and $F_{3D}$ of FIG. 6) and the second temporal-spatial feature ($\sigma(\hat{S}_t)$ and $\hat{F}_{3D}$ of FIG. 6) by using the R3D which is a neural network model extracting a temporal-spatial feature.

The 3D loss calculation module 520 may calculate temporal-spatial loss information ($\mathcal{L}_{3D}$) based on the first loss calculation function (Equation 1). Referring to Equation 1, $\mathcal{L}_{r3d}$ represents a norm for a difference between the first temporal-spatial feature ($\sigma(S_{gt})$) and the second temporal-spatial feature ($\sigma(\hat{S}_t)$). That is, $\mathcal{L}_{r3d}$ may be temporal-spatial loss information ($\mathcal{L}_{3D}$) based on a difference between the first temporal-spatial feature ($F_{3D}$) and the second temporal-spatial feature ($\hat{F}_{3D}$), and the learning module 110 may change a weight and/or a bias of a neural network of the interpolation frame generating module 120 so that temporal-spatial loss information ($\mathcal{L}_{3D}$ p) is 0 (e.g., the first temporal-spatial feature ($\sigma(S_{gt})$) is the same as the second temporal-spatial feature ($\sigma(\hat{S}_t)$).

In describing FIG. 6, it has been described that the 3D feature extraction module 510 and the 3D loss calculation module 520 use the R3D, but the example embodiments are not limited thereto and the first loss calculation function for calculating the temporal-spatial loss information ($\mathcal{L}_{3D}$) and a neural network model for extracting temporal-spatial features such as S3D and R(2+1)D may be used.

As described above, the learning module 110 may calculate the temporal-spatial loss information ($\mathcal{L}_{3D}$) between the first frame group 350 and the second frame group 360, based on the extracted temporal-spatial feature. For example, the first frame group 350 may include real photographed frames (the first frame 310, the second frame 320, and the first GT frame 330), and thus, the first temporal-spatial feature ($F_{3D}$) may be a real value (a right answer) and the second frame group 360 may include the first interpolation frame 340 generated by the interpolation frame generating module 120, whereby the second temporal-spatial feature ($\hat{F}_{3D}$) may be a prediction value. Therefore, the temporal-spatial loss information ($\mathcal{L}_{3D}$) may be an indicator representing the degree to which an interpolation frame generated by the interpolation frame generating module 120 expresses a temporal-spatial feature of a real frame, and the learning module 110 may correct a weight and/or a bias of a neural network NN of the interpolation frame generating module 120 so that the temporal-spatial loss information ($\mathcal{L}_{3D}$) converges to 0.

The 3D feature extraction module 510 may extract a complex feature including a temporal-spatial feature of a frame group. For example, the 3D feature extraction module 510 may additionally extract a reconstruction feature, a warping feature, and a distillation feature along with a temporal-spatial feature by using the first feature extraction model.

Also, the 3D loss calculation module 520 may more reflect loss caused by $\mathcal{L}_{rec}$, $\mathcal{L}_{warp}$, and $\mathcal{L}_{dis}$ to calculate complex loss information including the temporal-spatial loss information by using the first loss calculation function such as Equation 2.

$$\mathcal{L} = \lambda_1\mathcal{L}_{rec} + \lambda_2\mathcal{L}_{warp} + \lambda_3\mathcal{L}_{r3d} + \lambda_4\mathcal{L}_{dis} \qquad \text{[Equation 2]}$$

$\mathcal{L}_{rec}$ represents reconstruction loss based on a difference between a reconstruction feature (obtained by inputting the first frame group 350 to the first feature extraction model) and a reconstruction feature (obtained by inputting the second frame group 360 to the first feature extraction model). $\mathcal{L}_{warp}$ represents warping loss based on a difference between a warping feature (obtained by inputting the first frame group 350 to the first feature extraction model) and a warping feature (obtained by inputting the second frame group 360 to the first feature extraction model). $\mathcal{L}_{dis}$ represents distillation loss based on a difference between a distillation feature (obtained by inputting the first frame group 350 to the first feature extraction model) and a distillation feature (obtained by inputting the second frame group 360 to the first feature extraction model). $\lambda_1$, $\lambda_2$, $\lambda_3$, and $\lambda_4$ may each be a relative priority of each loss, e.g., defined by a user. For example, loss information calculated by the first loss calculation function (Equation 2) may be complex loss information including temporal-spatial information loss. In at least one example, the first loss function may denote a function which calculates a difference between complex features including a temporal-spatial feature.

The first loss calculation function based on Equation 1 or Equation 2 may be at least one embodiment and is not limited thereto, and another loss function for calculating a difference between complex features including a temporal-spatial feature or a difference between temporal-spatial features or a combination thereof may be used as the first loss calculation function.

Figure 7A:
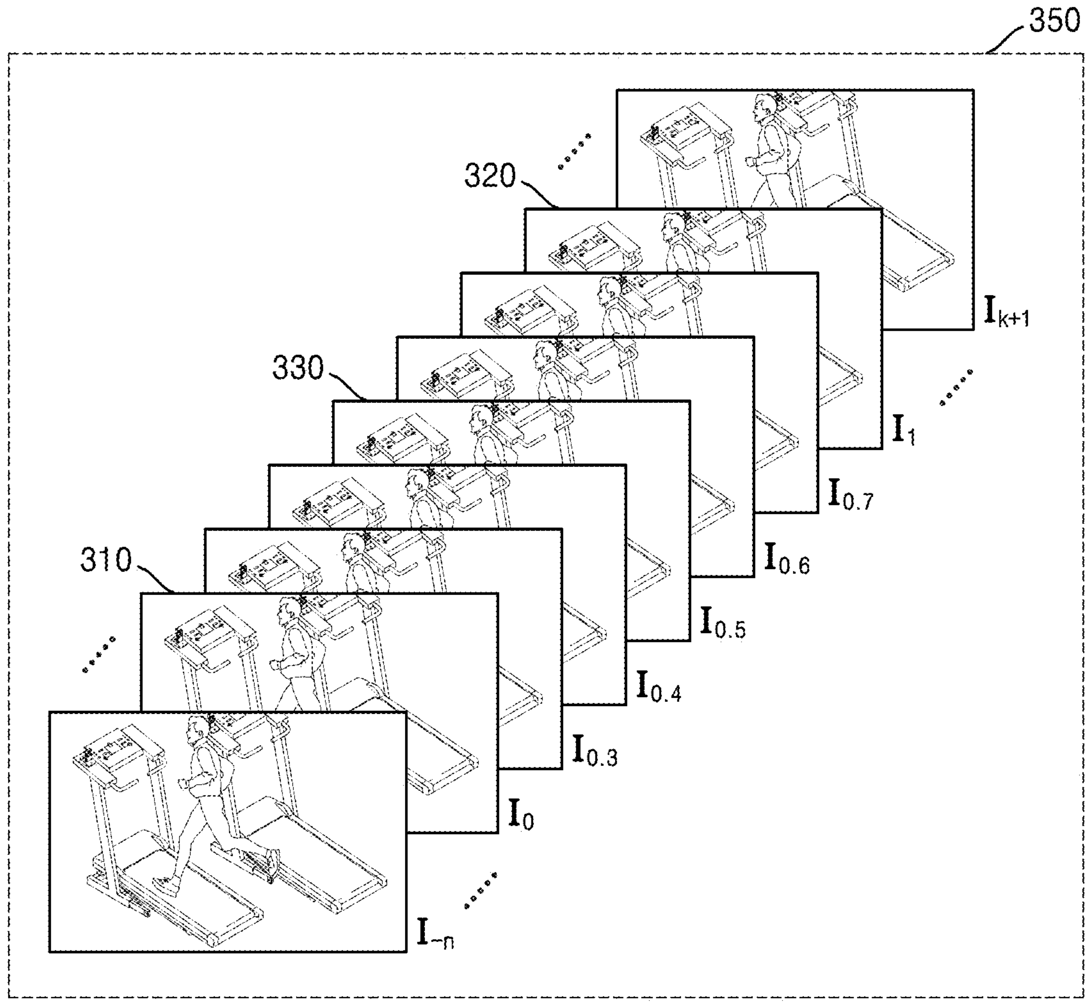
FIGS. 7A and 7B illustrate a first frame group and a second frame group according to at least one embodiment.
Figure 7B:
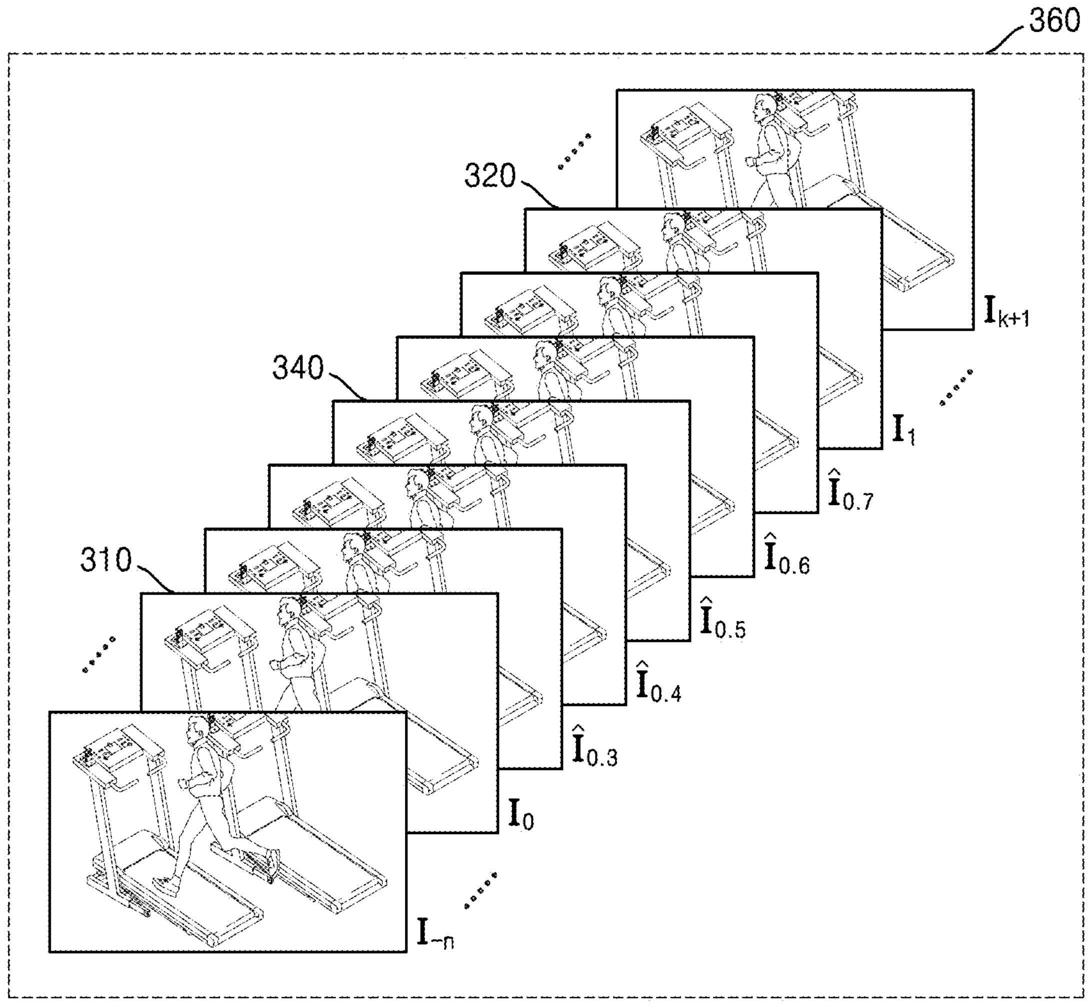

FIGS. 7A and 7B illustrate a first frame group and a second frame group according to at least one embodiment.

FIGS. 7A and 7B may be described with reference to FIG. 5, and repeated descriptions may be omitted.

Referring to FIG. 7A, a first frame group 350 may include a first frame 310, a second frame 320, and a first GT frame 330 and may further include n number of frames temporally preceding the first frame 310 and k number of frames temporally succeeding the second frame 320.

The first frame group 350 may include at least three frames. As described above, the first frame group 350 may be because at least three frames are needed for extracting a temporal-spatial feature. Accordingly, the second frame group 360 described below may include at least three frames.

Referring to FIG. 7B, a second frame group 360 may include a first frame 310, a second frame 320, and a first GT frame 330, and moreover, may include n number of frames temporally preceding the first frame 310 and k number of frames temporally succeeding the second frame 320.

Referring to FIGS. 7A and 7B, the first frame group 350 may include five GT frames, and the second frame group 360 may include five interpolation frames. That is, the first frame group 350 may include a plurality of GT frames, and the second frame group 360 may include a plurality of interpolation frames. In another embodiment, the first frame group 350 may include only GT frames, and the second frame group 360 may include only interpolation frames. The number of GT frames and interpolation frames of FIGS. 7A and 7B may be at least one embodiment.

Figure 8:
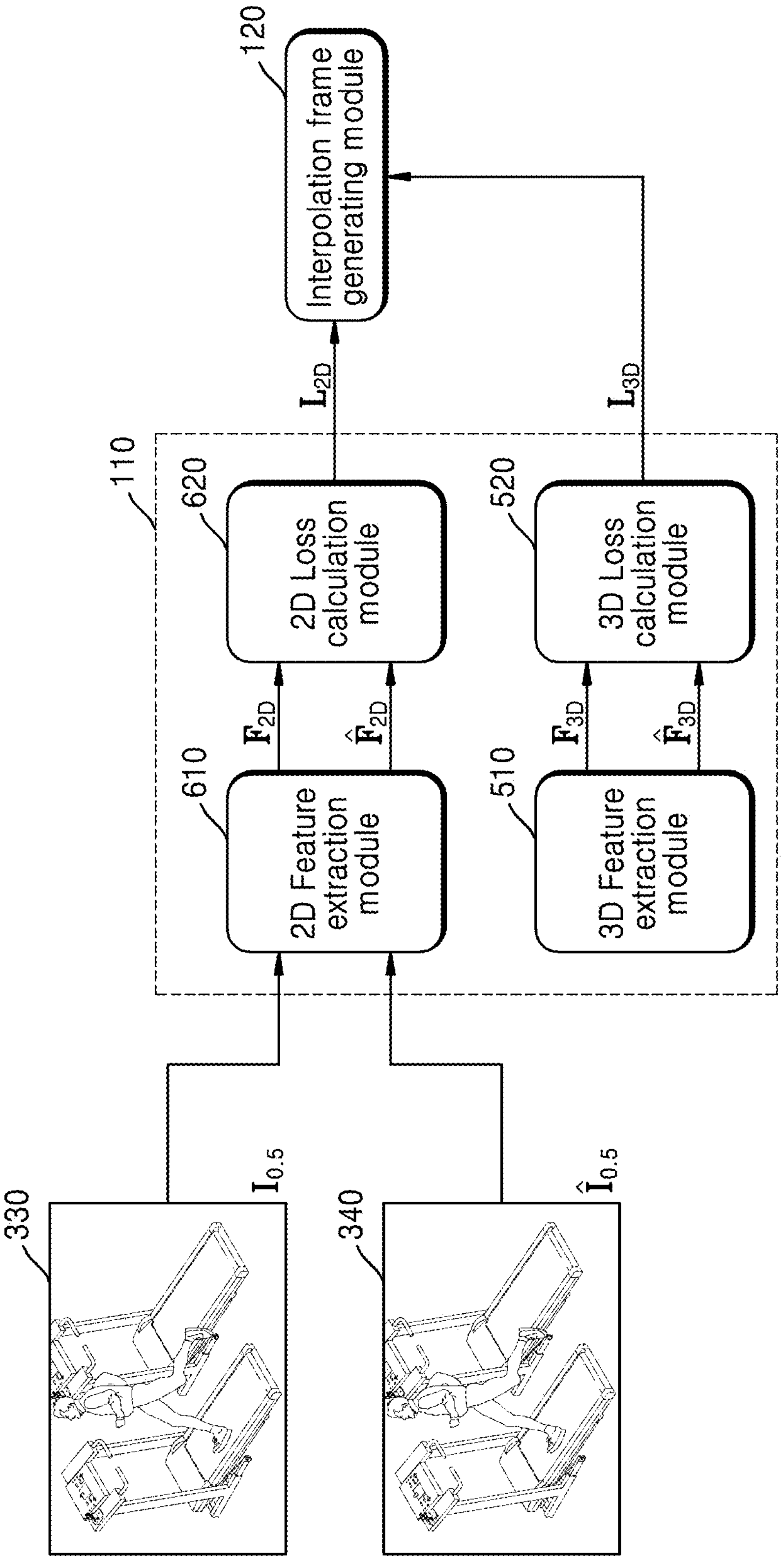
FIG. 8 is a diagram for describing an example which learns an interpolation frame generating module according to at least one embodiment.

FIG. 8 is a diagram for describing an example of learning an interpolation frame generating module? Example which learns an interpolation frame generating module according to at least one embodiment.

FIG. 8 may be described with reference to FIG. 6, and repeated descriptions may be omitted.

The learning module 110 of FIG. 8 may include the 3D feature extraction module 510 and the 3D loss calculation module 520 of FIG. 6 and may further include a 2D feature extraction module 610 and a 2D loss calculation module 620. The learning module 110 of FIG. 8 may train an interpolation model based on temporal-spatial loss information and/or spatial loss information. However, temporal-spatial loss information associated with the 3D feature extraction module 510 and the 3D loss calculation module 520 has been described with reference to FIG. 6, and thus, in FIG. 8, learning of an interpolation model based on spatial loss information is described with reference to the 2D feature extraction module 610 and the 2D loss calculation module 620.

As described above with reference to FIG. 4, a first frame 310 and a second frame 320 may be input to an interpolation frame generating module 120, and the interpolation frame generating module 120 may generate a first interpolation frame 340. The first interpolation frame 340 and the first GT frame 330 may be input to the learning module 110, and the learning module 110 may train the interpolation frame generating module 120 based on a spatial feature difference between the first interpolation frame 340 and the first GT frame 330.

The 2D feature extraction module 610 may extract a first spatial feature ($F_{2D}$) of the first GT frame 330 and a second spatial feature ($\hat{F}_{2D}$) of the first interpolation frame 340 by using a model (a second feature extraction model) for extracting a spatial feature. Here, the second feature extraction model may be a model which calculates a difference between pixel values of frames or may be a neural network model described below, but is not limited thereto.

For example, in a case where the 2D feature extraction module 610 uses a neural network model as the second feature extraction model so as to extract a spatial feature, the spatial feature may be a feature map of the neural network model which extracts the spatial feature. For example, the neural network model which extracts the spatial feature may be a visual geometry group (VGG), and the VGG may include a plurality of convolution layers. In this case, the feature map may correspond to input data of a convolution layer and a 2D convolution result of a filter. In a 2D convolution, a temporal-spatial feature of a frame may be lost, but a spatial feature may be maintained. Therefore, a feature map (or a 2D feature map) including a spatial feature may be output by the 2D convolution. Therefore, an operation of extracting the 2D feature map may be referred to as an operation of extracting the spatial feature.

The 2D feature extraction module 610 may extract a first spatial feature ($F_{2D}$) of the first GT frame 330 and a second spatial feature ($\hat{F}_{2D}$) of the first interpolation frame 340 by using the second feature extraction model. Also, the 2D loss calculation module 620 may calculate spatial loss information ($\mathcal{L}_{2D}$) based on a difference between the first spatial feature ($F_{2D}$) and the second spatial feature ($\hat{F}_{2D}$).

For example, in a case where the 2D feature extraction module 610 extracts the first spatial feature ($F_{2D}$) and the second spatial feature ($\hat{F}_{2D}$) by using the VGG, which is a neural network model, as the second feature extraction model, the 2D loss calculation module 620 may calculate spatial loss information ($\mathcal{L}_{2D}$) based on the following second loss calculation function (Equation 3).

$$\mathcal{L}_{vgg} = \left\|\phi(\hat{I}_t) - \phi(I_{gt})\right\|_2^2 \quad \text{[Equation 3]}$$

In a case where the 2D feature extraction module 610 extracts a spatial feature of a frame by using the VGG, the second loss calculation function (Equation 3) may be a 2D perceptual loss function for calculating spatial loss information ($\mathcal{L}_{2D}$) based on a spatial feature difference (a difference between $F_{2D}$ and $\hat{F}_{2D}$).

Here, $I_{gt}$ represents a GT frame, and $\hat{I}_t$ may represent an interpolation frame. Therefore, $I_{gt}$ may be a first GT frame 330, and $\hat{I}_t$ may be a first interpolation frame 340.

represents a 2D feature map including a spatial feature extracted from a fourth convolution layer of a fifth block of the VGG when the GT frame is input to the VGG. Here, the VGG may be a neural network including a plurality of blocks. Each of the plurality of blocks may include at least one convolution layer and/or max pooling layer. The fourth convolution layer of the fifth block of the VGG described below may correspond to a final convolution layer of a neural network. That is, $\phi(I_{gt})$ corresponds to a first spatial feature ($F_{2D}$) of FIG. 8.

$\phi(\hat{I}_t)$ represents a 2D feature map including a spatial feature extracted from the fourth convolution layer of the fifth block of the VGG when the interpolation frame is input to the VGG. That is, $\hat{F}_{2D}$ may correspond to the second spatial feature ($\hat{F}_{2D}$) of FIG. 8. Therefore, the 2D feature extraction module 610 may extract the first temporal-spatial feature ($\phi(I_{gt})$ and $F_{2D}$ of FIG. 8) and the second temporal-spatial feature ($\phi(\hat{I}_t)$ and $\hat{F}_{2D}$ of FIG. 8) by using the VGG, which is a neural network model extracting a spatial feature.

The 2D loss calculation module 620 is configured to calculate spatial loss information ($\mathcal{L}_{2D}$) based on the second loss calculation function (Equation 3). Referring to Equation 3, $\mathcal{L}_{vgg}$ may be a norm for a difference between the first spatial feature ($\phi(I_{gt})$) and the second spatial feature ($\phi(\hat{I}_t)$). That is, $\mathcal{L}_{vgg}$ may be spatial loss information ($\mathcal{L}_{2D}$) based on a difference between the first spatial feature ($F_{2D}$) and the second spatial feature ($\hat{F}_{2D}$), and the learning module 110 may change a weight and/or a bias of a neural network of the interpolation frame generating module 120 so that spatial loss information ($\mathcal{L}_{2D}$) is 0.

To arrange the above description, the learning module 110 may calculate spatial loss information ($\mathcal{L}_{2D}$) between the first GT frame 330 and the first interpolation frame 340, based on the extracted spatial feature. For example, because the first GT frame 330 is a real photographed frame, the first spatial feature ($F_{2D}$) may be a real value (a right answer) and the first interpolation frame 340 may be a frame generated by the interpolation frame generating module 120, and thus, the second spatial feature ($\hat{F}_{2D}$) may be a prediction value. Therefore, the spatial loss information ($\mathcal{L}_{2D}$) may be an indicator representing the degree to which an interpolation frame generated by the interpolation frame generating module 120 expresses a spatial feature of a real frame, and the learning module 110 may correct a weight and/or a bias of a neural network NN of the interpolation frame generating module 120 so that the spatial loss information ($\mathcal{L}_{2D}$) converges to 0.

Figure 9:
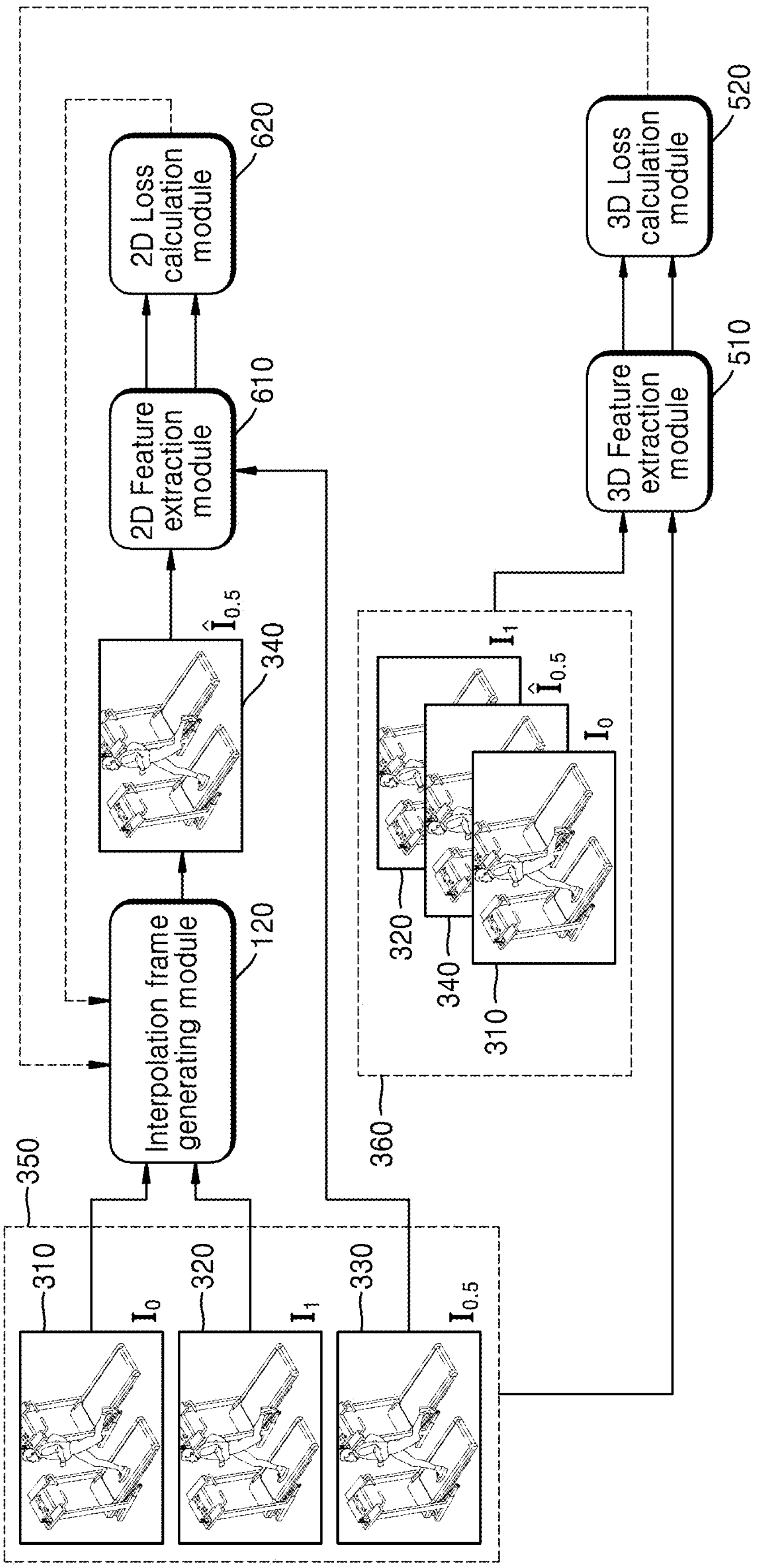
FIG. 9 is a diagram for describing an example which learns an interpolation frame generating module according to at least one embodiment.

FIG. 9 is a diagram for describing an example which learns an interpolation frame generating module according to at least one embodiment.

FIG. 9 will be described with reference to the descriptions of FIGS. 6 and 8.

Although FIG. 9 does not illustrate the learning module 110, the learning module 110 may be included and may include the 3D feature extraction module 510, the 3D loss calculation module 520, the 2D feature extraction module 610, and/or the 2D loss calculation module 620. In at least one embodiment, the interpolation frame generating module may be configured to be periodically retrained during the use of interpolation frame generating module, using, e.g., the learning module 110.

An interpolation frame generating module 120 may generate a first interpolation frame 340 by using an interpolation model based on a neural network, based on a first frame 310 and a second frame 320.

The first interpolation frame 340 may be included in a second frame group 360 along with a first frame 310 and a second frame 320, and a first GT frame 330, and a first frame 310, a second frame 320, and a first GT frame 330 may be included in a first frame group 350.

The learning module 110 may calculate temporal-spatial loss information ($\mathcal{L}_{3D}$) between the first frame group 350 and the second frame group 360 by using a neural network model (for example, a first feature extraction model) which extracts a temporal-spatial feature.

The 3D feature extraction module 510 may extract each of a first temporal-spatial feature ($F_{3D}$) of the first frame group 350 and a second temporal-spatial feature ($\hat{F}_{3D}$) of the second frame group 360 by using the first feature extraction model (for example, the trained 3D CNN). The 3D loss calculation module 520 may calculate temporal-spatial loss information ($\mathcal{L}_{3D}$) by using a first loss calculation function (for example, Equation 1), based on a difference between the first temporal-spatial feature ($F_{3D}$) and the second temporal-spatial feature ($\hat{F}_{3D}$).

The learning module 110 may train the interpolation frame generating module 120 so as to decrease the calculated temporal-spatial loss information ($\mathcal{L}_{3D}$). In other words, a weight and/or a bias of a neural network of an interpolation model may be changed so that the temporal-spatial loss information ($\mathcal{L}_{3D}$) is reduced.

Also, the learning module 110 may calculate spatial loss information ($\mathcal{L}_{2D}$) between the first GT frame 330 and the first interpolation frame 340 by using the 2D feature extraction module 610 and the 2D loss calculation module 620. That is, the 2D feature extraction module 610 may extract each of a first spatial feature ($F_{2D}$) of the first GT frame 330 and a second spatial feature ($\hat{F}_{2D}$) of the first interpolation frame 340 by using a second feature extraction model (for example, the VGG), and the 2D loss calculation module 620 may calculate spatial loss information ($\mathcal{L}_{2D}$) by using a second loss calculation function (for example, Equation 3), based on a difference between the first spatial feature ($F_{2D}$) and the second spatial feature ($\hat{F}_{2D}$).

The learning module 110 may train the interpolation frame generating module 120 so as to decrease spatial loss information ($\mathcal{L}_{2D}$) as well as temporal-spatial loss information ($\mathcal{L}_{3D}$). For example, a weight and/or a bias of a neural network of an interpolation model may be changed.

Figure 10:
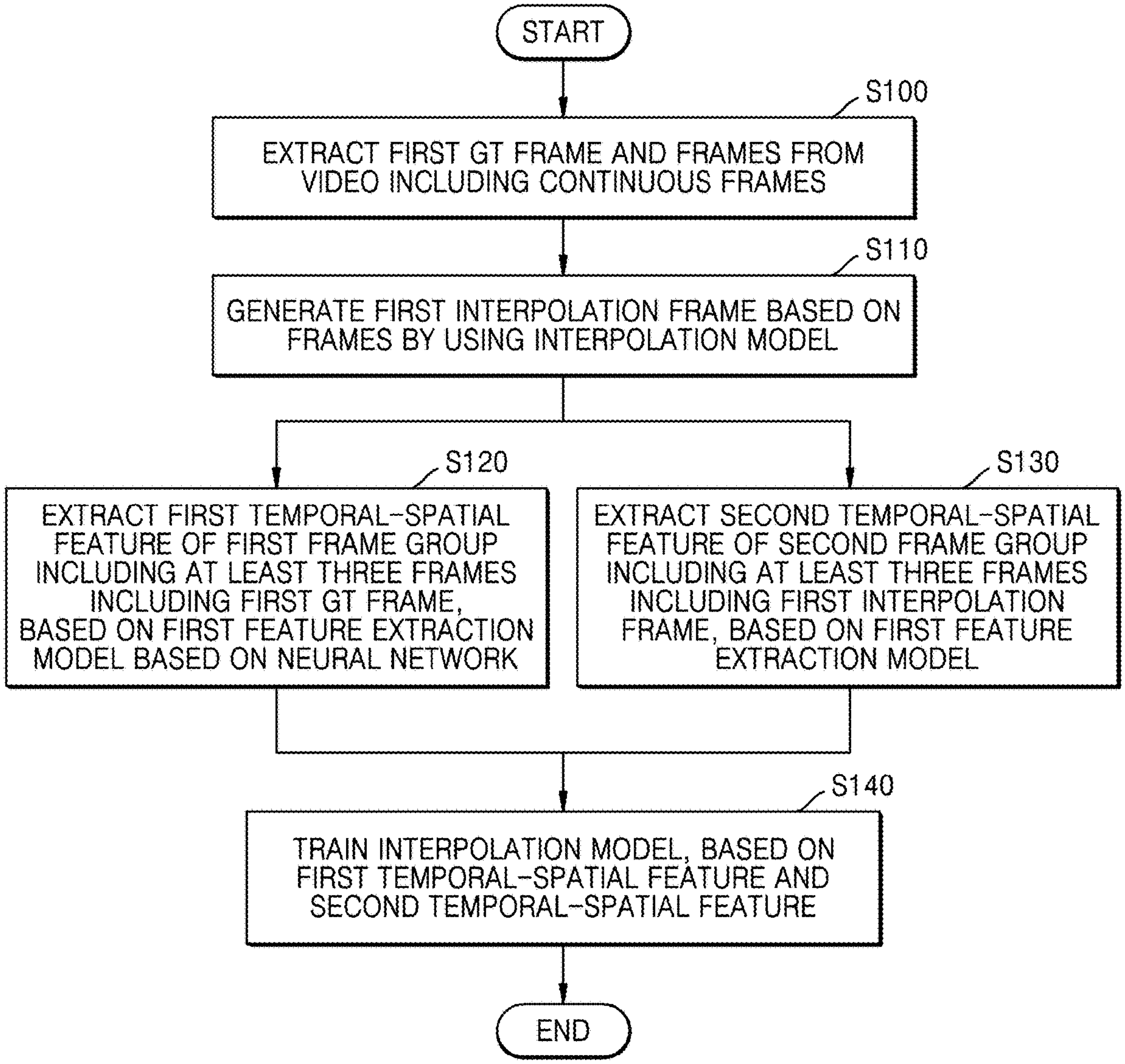
FIGS. 10 and 11 are flowcharts illustrating an interpolation model learning method according to at least one embodiment.
Figure 11:
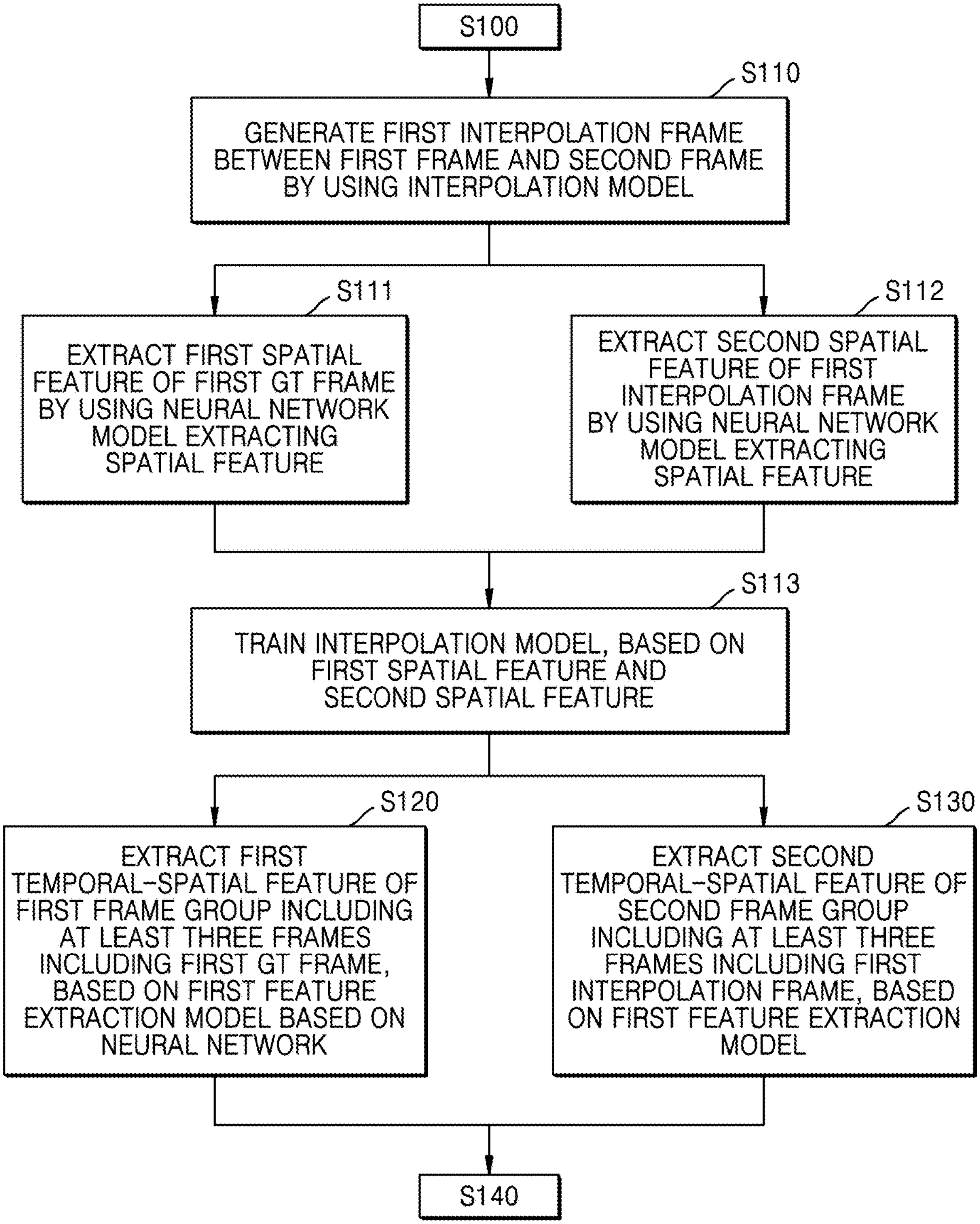

FIGS. 10 and 11 are flowcharts illustrating an interpolation model learning method according to at least one embodiment. The method of FIGS. 10 and 11 may be performed by the electronic system 100 of FIG. 1 and a device 1000 of FIG. 12, and the descriptions of FIGS. 1 to 9 may be applied to at least one embodiment.

Referring to FIG. 10, a plurality of frames and a first GT frame may be extracted from a video including a plurality of continuous frames in operation $100. The plurality of frames may include the first frame 310 and the second frame 320 described above with reference to FIGS. 3 and 4, and the learning module 110 or the interpolation frame generating module 120 included in the electronic system 100 or a processor 1100 of a learning device (e.g., the device 1000 of FIG. 12) may extract the plurality of frames (including the first frame 310 and the second frame 320) and the first GT frame 330 from a video.

An interpolation frame generating module (120 of FIG. 1) may generate a first interpolation frame 340 based on the plurality of frames by using an interpolation model.

A 3D feature extraction module (510 of FIG. 6) may extract a first temporal-spatial feature ($F_{3D}$ of FIG. 6) of a first frame group (350 of FIG. 6) including at least three frames including the first GT frame (330 of FIG. 3), based on the first feature extraction model in operation S120. The first feature extraction model may be implemented as a neural network model.

The 3D feature extraction module (510 of FIG. 6) may extract a second temporal-spatial feature ($\hat{F}_{3D}$ of FIG. 6) of a second frame group (360 of FIG. 6) including at least three frames including the first interpolation frame (340 of FIG. 3), based on the first feature extraction model in operation S130.

The interpolation model may be trained based on a first temporal-spatial feature ($F_{3D}$) and a second temporal-spatial feature ($\hat{F}_{3D}$) in operation S140. In at least one embodiment, the steps S100 to S140 may be repeated at different times of the video such that the interpolation model is trained on a plurality of different frames representing different times during the video.

Referring to FIG. 11, after the first interpolation frame (340 of FIG. 3) is generated, the 2D feature extraction module (610 of FIG. 8) may extract a first spatial feature ($F_{2D}$ of FIG. 8) of the first GT frame (330 of FIG. 3) by using a neural network model for extracting a spatial feature in operation S111. The 2D feature extraction module (610 of FIG. 8) is not limited to the neural network model and may be a model which extracts a pixel value of a frame.

The 2D feature extraction module (610 of FIG. 8) may extract a second spatial feature ($\hat{F}_{2D}$ of FIG. 8) of the first interpolation frame (340 of FIG. 3), based on the second feature extraction model in operation S112.

The learning module 110 may train the interpolation model, based on the first spatial feature ($F_{2D}$ of FIG. 8) and the second spatial feature ($\hat{F}_{2D}$ of FIG. 8) in operation S113.

Figure 12:
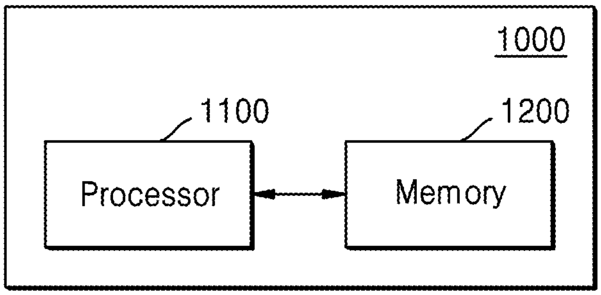
FIG. 12 is a block diagram of a neural network learning device according to at least one embodiment.

FIG. 12 is a block diagram of a neural network learning device 1000 according to at least one embodiment.

Referring to FIG. 12, the neural network learning device 1000 may include a processor 1100 and a memory 1200. FIG. 12 illustrates one processor 1100, but is not limited thereto and the neural network learning device 1000 may include a plurality of processors.

The processor 1100 may include a connection path (for example, a bus) which transfers or receives a signal to or from other elements such as one or more cores (not shown) and a GPU (not shown) and/or a training database (130 of FIG. 1).

The processor 1100 may perform an operation of a learning module (110 of FIG. 1) (for example, learning of an interpolation frame generating module (120 of FIG. 1)) described above with reference to FIGS. 1 to 11. For example, the processor 1100 may generate a first interpolation frame (340 of FIG. 1), based on training data (for example, continuous first frame (310 of FIG. 1) and second frame (320 of FIG. 1)) included in the training database (130 of FIG. 1). The processor 1100 may generate the first interpolation frame between a first frame and a second frame, based on an interpolation model based on a neural network.

The processor 1100 may compare a temporal-spatial feature of a first frame group (350 of FIG. 1) with a temporal-spatial feature of a second frame group (360 of FIG. 1) and may train an interpolation frame generating module (120 of FIG. 1) based on a temporal-spatial feature difference. In other words, the processor 1100 may adjust a parameter (for example, a bias, a weight, etc.) of the interpolation model based on a neural network so that the temporal-spatial feature difference is reduced.

In at least one embodiment, the processor 1100 may compare a spatial feature of a first interpolation frame (340 of FIG. 1) with a spatial feature of a first GT frame (330 of FIG. 1) to calculate a spatial feature difference and may train the interpolation frame generating module (120 of FIG. 1) so that the temporal-spatial feature difference and the spatial feature difference are reduced.

Furthermore, the processor 1100 may further include random access memory (RAM) (not shown) and read-only memory (ROM) (not shown), which temporarily and/or permanently store a signal (or data) processed by the processor 1100. Also, the processor 1100 may be implemented as a system on chip (SoC) type including at least one of a GPU, RAM, and ROM.

The memory 1200 may store programs (one or more instructions) for processing and control by the processor 1100. The memory 1200 may include the learning module 110 described above with reference to FIG. 1 and a plurality of modules where a function of the interpolation frame generating module 120 is implemented. Also, the memory 1200 may include a training database (130 of FIG. 1).

Figure 13:
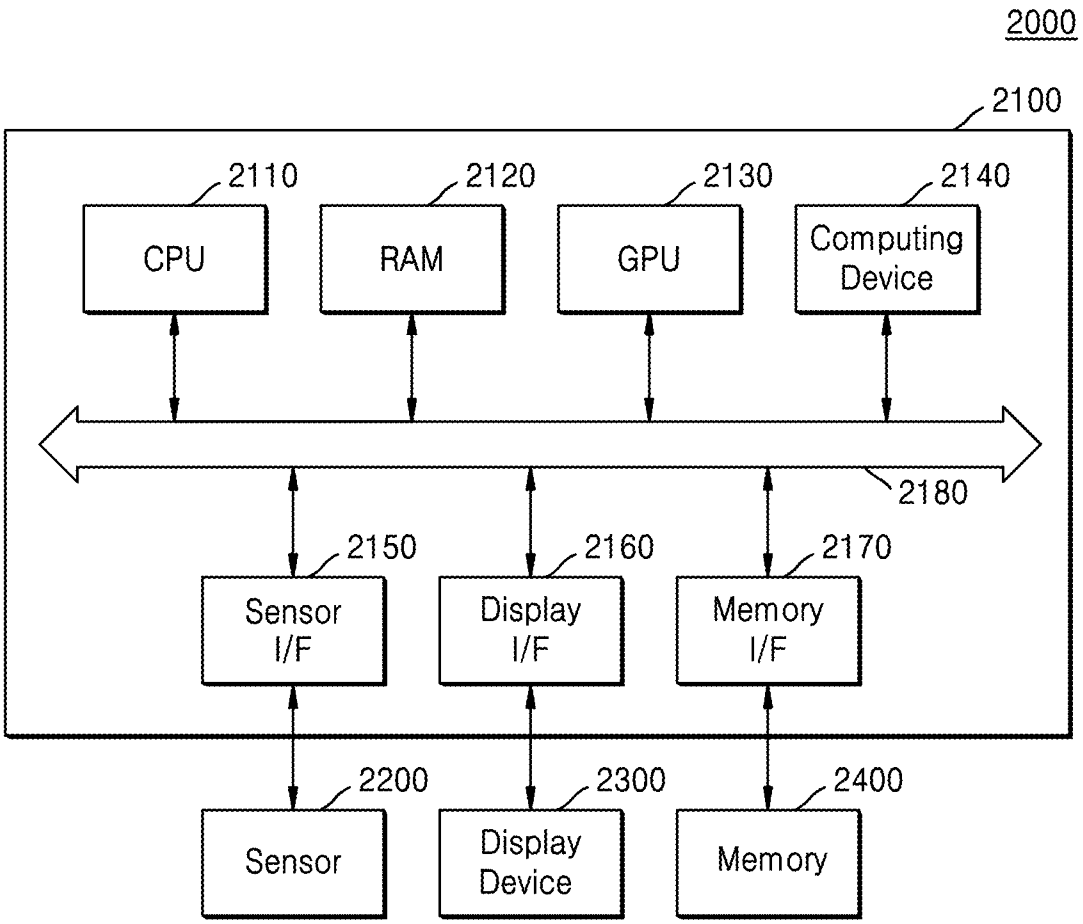
FIG. 13 is a block diagram an integrated circuit and a device including the same, according to at least one embodiment.

FIG. 13 is a block diagram an integrated circuit and a device 2000 including the same, according to at least one embodiment.

The device 2000 may include an integrated circuit 2100 and elements (for example, a sensor 2200, a display device 2300, and a memory 2400) connected with the integrated circuit 2100. The device 2000 may be a device which processes data based on a neural network. For example, the device 2000 may include a data server or a mobile device such as a smartphone, a game machine, an advanced driver assistance system (ADAS), or a wearable device.

The integrated circuit 2100 according to at least one embodiment may include a CPU 2110, random access memory (RAM) 2120, a GPU 2130, a computing device 2140, a sensor interface 2150, a display interface 2160, and a memory interface 2170. Furthermore, the integrated circuit 2100 may further include other general-use elements such as a communication module, a digital signal processor (DSP), and/or a video module; and the CPU 2110, the RAM 2120, the GPU 2130, the computing device 2140, the sensor interface 2150, the display interface 2160, and the memory interface 2170 of the integrated circuit 2100 may transfer or receive data therebetween through a bus 2180. In at least one embodiment, the integrated circuit 2100 may be an AP. In at least one embodiment, the integrated circuit 2100 may be implemented as an SoC (system-on-a-chip).

The CPU 2110 may control the overall operation of the integrated circuit 2100. The CPU 2110 may include one processor core (single core), or may include a plurality of processor cores (multi-core). The CPU 2110 may process or execute data and/or instructions stored in the memory 2400. In at least one embodiment, the CPU 2110 may execute programs stored in the memory 2400 and may thus perform an interpolation model learning method according to embodiments.

The RAM 2120 may temporarily store programs, data, and/or instructions. According to at least one embodiment, the RAM 2120 may be implemented as dynamic RAM (DRAM) or static RAM (SRAM). The RAM 2120 may temporarily store data (for example, image data) which is input/output through the sensor interface 2150 and the display interface 2160, or is generated by the GPU 2130 or the CPU 2110.

In at least one embodiment, the integrated circuit 2100 may further include read-only memory (ROM). The ROM may store programs and/or data which are/is used continuously. The ROM may be implemented as erasable programmable ROM (EPROM) or electrically erasable programmable ROM (EEPROM).

The GPU 2130 may perform image processing on image data. For example, the GPU 2130 may perform image processing on the image data received through the sensor interface 2150. Image data obtained through processing by the GPU 2130 may be stored in the memory 2400, or may be provided to the display device 2300 through the display interface 2160.

The computing device 2140 may include an accelerator for performing an operation of a neural network. For example, the computing device 2140 may include an NPU. In at least one embodiment, the GPU 2130 or the computing device 2140 may perform an operation of the neural network in a learning process or a data recognition process of the neural network.

The sensor interface 2150 may receive data (for example, image data, sound data, etc.) input from the sensor 2200 connected with the integrated circuit 2100.

The display interface 2160 may output data (for example, an image) to the display device 2300. The display device 2300 may output image data or video data through a display such as a liquid crystal display (LCD) or active matrix organic light emitting diodes (AMOLED).

The memory interface 2170 may interface data, input from the memory 240 outside the integrated circuit 2100, or data output from the memory 2400. According to at least one embodiment, the memory 2400 may be implemented as a volatile memory, such as DRAM or SRAM, or a non-volatile memory such as resistive random access memory (ReRAM), phase-change random access memory (PRAM), or NAND flash. The memory 2400 may be implemented as a memory card (multimedia card (MMC), an embedded multi-media card (eMMC), a secure digital (SD) card, or a micro SD card).

The integrated circuit 2100 may be an AP, the memory 2400 may include a trained interpolation model (or an interpolation frame generating model) according to at least one embodiment described above with reference to FIGS. 6 to 9, and the computing device 2140 may perform a neural network operation based on the interpolation model, thereby generating an interpolation frame between at least two frames received. Here, the at least two frames may be frames extracted from video data received from the image sensor 2200, or may be at least two frames extracted from video data received through a communication interface. For example, a CPU or a GPU may extract at least two frames.

In at least one embodiment, the integrated circuit 2100 may generate training data and may learn the interpolation model based on the training data. For example, the integrated circuit 2100 may learn (or relearn) the interpolation model according to at least one embodiment described above with reference to FIGS. 6 to 9.

Hereinabove, embodiments have been described in the drawings and the specification. Embodiments have been described by using the terms described herein, but this has been merely used for describing the inventive concepts and has not been used for limiting a meaning or limiting the scope of the inventive concepts defined in the following claims. Therefore, it may be understood by those of ordinary skill in the art that various modifications and other equivalent embodiments may be implemented from the inventive concepts. Accordingly, the spirit and scope of the inventive concepts may be defined based on the spirit and scope of the following claims.

While the inventive concepts have been particularly shown and described with reference to embodiments thereof, it will be understood that various changes in form and details may be made therein without departing from the spirit and scope of the following claims.

What is claimed is:

1. An interpolation model learning method comprising:

extracting, from a video including a plurality of continuous frames, a first ground truth (GT) frame and a plurality of frames;

generating a first interpolation frame based on the plurality of frames using an interpolation model;

using a first feature extraction model to extract a first temporal-spatial feature of a first frame group including at least three frames including the first GT frame;

using the first feature extraction model to extract a second temporal-spatial feature of a second frame group including at least three frames including the first interpolation frame, based on the first feature extraction model; and training the interpolation model, based on the first temporal-spatial feature and the second temporal-spatial feature, wherein the training of the interpolation model comprises determining temporal-spatial loss information based on a difference between the first temporal-spatial feature and the second temporal-spatial feature, and adjusting at least one operation parameter of the interpolation model to decrease the temporal-spatial loss information.

2. The interpolation model learning method of claim 1, further comprising:

extracting a first spatial feature of the first GT frame, based on a second feature extraction model;

extracting a second spatial feature of the first interpolation frame using the second feature extraction model; and training the interpolation model, based on the first spatial feature and the second spatial feature.

3. The interpolation model learning method of claim 2, wherein the training of the interpolation model based on the first spatial feature and the second spatial feature comprises:

determining spatial loss information based on a difference between the first spatial feature and the second spatial feature; and adjusting an operation parameter of the interpolation model, based on the spatial loss information.

4. The interpolation model learning method of claim 1, wherein the using the first feature extraction model to extract the first GT frame comprises further extracting n number of GT frames from the video, the generating of the first interpolation frame comprises further generating n number of interpolation frames based on the plurality of frames, the first frame group comprises the first GT frame and the n number of GT frames, the second frame group comprises the first interpolation frame and the n number of interpolation frames, and n is an integer of 1 or more.

5. The interpolation model learning method of claim 4, wherein the first frame group comprises the plurality of frames, and the second frame group comprises the plurality of frames.

6. The interpolation model learning method of claim 1, wherein the interpolation model comprises an interpolation neural network model including a plurality of layers.

7. The interpolation model learning method of claim 1, wherein the first feature extraction model comprises a convolution neural network.

8. The interpolation model learning method of claim 1, wherein a number of frames included in the first frame group is equal to a number of frames included in the second frame group.

9. A device configured to learn an interpolation frame generating model, the device comprising:

a memory storing a program configured to train the interpolation frame generating model; and a processor configured to execute the program stored in the memory, wherein the processor is configured to, by executing the program, extract a plurality of frames from a plurality of continuous frames, the plurality of frames including a first frame, a second frame, and a first ground truth (GT) frame, the first GT frame temporally arranged between the first frame and the second frame, generate a first interpolation frame between the first frame and the second frame using the interpolation frame generating model, use a first feature extraction model to extract a first complex feature between at least three frames included in a first frame group, the at least three frames of the first frame group comprising the first GT frame and at least two frames, use the first feature extraction model to extract a second complex feature between at least three frames included in a second frame group, the at least three frames of the second frame group comprising the first interpolation frame and the at least two frames, determine a complex loss information based on a difference between the first complex feature and the second complex feature, and train the interpolation frame generating model by adjusting at least one operation parameter of the interpolation frame generating model such that the complex loss information is decreased.

10. The device of claim 9, wherein the first complex feature comprises a temporal-spatial feature between the first GT frame and the at least two frames, and the second complex feature comprises a temporal-spatial feature between the first interpolation frame and the at least two frames.

11. The device of claim 9, wherein the processor is configured to extract a first spatial feature of the first GT frame, based on a second feature extraction model, extract a second spatial feature of the first interpolation frame, based on a second feature extraction model, and train the interpolation frame generating model, based on the first spatial feature and the second spatial feature.

12. The device of claim 9, wherein the processor is configured to extract n number of frames temporally preceding the first frame and k number of frames temporally succeeding the second frame, from the plurality of continuous frames, and generate the first interpolation frame, based on the first frame, the second frame, the n number of frames, and the k number of frames, and wherein each of n and k is an integer of 1 or more.

13. The device of claim 12, wherein each of the first frame group and the second frame group comprises the first interpolation frame, based on the first frame, the second frame, the n number of frames, and the k number of frames.

14. The device of claim 12, wherein n is equal to k.

15. The device of claim 9, wherein the processor is configured to extract a second GT frame temporally arranged between the first frame and the first GT frame, generate a second interpolation frame between the first frame and the first GT frame using the interpolation frame generating model, extract a third GT frame temporally arranged between the first frame and the second GT frame, and generate a third interpolation frame between the first frame and the second GT frame by using the interpolation frame generating model, and wherein the first frame group comprises the second GT frame and the third GT frame, and the second frame group comprises the second interpolation frame and the third interpolation frame.

16. A non-transitory computer-readable storage medium storing instructions, which when executed by a processor, cause the processor to perform learning of an interpolation model using a plurality of frames, the plurality of frames comprise a first frame, a second frame, and a first ground truth (GT) frame temporally arranged between the first frame and the second frame, the instructions including:

generate a first interpolation frame between the first frame and the second frame using the interpolation model;

extract a first temporal-spatial feature of a first frame group, including at least three frames including the first GT frame, using an extraction neural network model configured to extract a temporal-spatial feature between frames;

extract a second temporal-spatial feature of a second frame group, including at least three frames including the first interpolation frame, using the extraction neural network model;

determine temporal-spatial loss information based on a difference between the first temporal-spatial feature and the second temporal-spatial feature; and train the interpolation model by adjusting at least one operation parameter of the interpolation model such that the temporal-spatial loss information is decreased.

17. The non-transitory computer-readable storage medium of claim 16, wherein the processor is further caused to perform:

extract a first spatial feature of the first GT frame using a second feature extraction model configured to extract a spatial feature of a frame;

extract a second spatial feature of the first interpolation frame using the second feature extraction model;

determine spatial loss information based on a difference between the first spatial feature and the second spatial feature; and train the interpolation model by using the spatial loss information.

18. The non-transitory computer-readable storage medium of claim 16, wherein the plurality of frames further comprise n number of GT frames temporally arranged between the first frame and the second frame, wherein the generating of the first interpolation frame further includes generating an n number of interpolation frames between the first frame and the second frame, the first frame group comprises the first GT frame and the n number of GT frames, the second frame group comprises the first interpolation frame and the n number of interpolation frames, and n is an integer of 1 or more.

19. The non-transitory computer-readable storage medium of claim 16, wherein the plurality of frames further comprise n number of frames temporally preceding the first frame and k number of frames temporally succeeding the second frame, and the generating of the first interpolation frame comprises generating the first interpolation frame, based on the first frame, the second frame, the n number of frames, and the k number of frames, and n is an integer of 1 or more and n is equal to the k.

* * * * *